US009286734B2

(12) United States Patent
Vanuytven

(10) Patent No.: US 9,286,734 B2
(45) Date of Patent: Mar. 15, 2016

(54) SYSTEM AND METHOD OF CALIBRATING A SYSTEM

(75) Inventor: Eddy Vanuytven, Herentals (BE)

(73) Assignee: TIMETRONICS N.V., Olen (BE)

( * ) Notice: Subject to any disclaimer, the term of this patent is extended or adjusted under 35 U.S.C. 154(b) by 837 days.

(21) Appl. No.: 13/499,302

(22) PCT Filed: Oct. 4, 2010

(86) PCT No.: PCT/EP2010/064743
§ 371 (c)(1), (2), (4) Date: Mar. 30, 2012

(87) PCT Pub. No.: WO2011/039376
PCT Pub. Date: Apr. 7, 2011

(65) Prior Publication Data

US 2012/0188381 A1 Jul. 26, 2012

(30) Foreign Application Priority Data

Oct. 2, 2009 (GB) .................................. 0917305.5

(51) Int. Cl.

| | |
|---|---|
| ***H04N 17/00*** | (2006.01) |
| ***G07C 1/24*** | (2006.01) |
| *G04F 8/08* | (2006.01) |
| *G07C 1/22* | (2006.01) |

(52) U.S. Cl.
CPC ........................................ *G07C 1/24* (2013.01)

(58) Field of Classification Search
CPC .......... G07C 1/24; G07C 1/22; A63H 18/005; G06F 8/08; H04N 21/8126
USPC .......................................................... 348/157
See application file for complete search history.

(56) References Cited

U.S. PATENT DOCUMENTS

| | | | | |
|---|---|---|---|---|
| 3,678,189 A | 7/1972 | Oswald | | |
| 6,411,329 B1 * | 6/2002 | Richard | G07C 1/24 | 348/157 |
| 6,433,817 B1 * | 8/2002 | Guerra | G07C 1/24 | 348/157 |

(Continued)

FOREIGN PATENT DOCUMENTS

| | | |
|---|---|---|
| EP | 0516449 A1 | 5/1992 |
| EP | 0583441 | 9/1993 |
| EP | 0898249 A1 | 2/1999 |
| JP | 2007315899 A | 12/2007 |
| WO | 9215969 A1 | 9/1992 |
| WO | 9317372 A1 | 9/1993 |

OTHER PUBLICATIONS

International Search Report in PCT/EP2010/064743, Jan. 12, 2011.

(Continued)

*Primary Examiner* — Andy Rao
*Assistant Examiner* — Obafemi Sosanya
(74) *Attorney, Agent, or Firm* — Bacon & Thomas, PLLC

(57) ABSTRACT

The system measures time of at least one object on the basis of passing a finish line and includes a camera with a photo-sensitive sensor and a lens for registering an image of the line. The image is sent to a processor for processing. Timing means deliver a timing signal to the processor. The system is at least partially automatically aligned. It thereto comprises a first active optical indicator that is located at a predefined location with reference to the line of passage, which indicator is detected as part of the image registered by the camera so as to obtain detection data. The system further includes a camera adjustment arrangement for adjustment of the orientation of a center axis of the camera, said adjustment being specified by the processor on the basis of the detection data.

22 Claims, 3 Drawing Sheets

(56) References Cited

U.S. PATENT DOCUMENTS

| | | | | |
|---|---|---|---|---|
| 2004/0156467 | A1* | 8/2004 | Freifeld | A63H 18/005 377/100 |
| 2005/0117018 | A1* | 6/2005 | Wolf | H04N 5/23206 348/143 |

OTHER PUBLICATIONS

Written Opinion of ISA in PCT/EP2010/064743, Jan. 12, 2011.

Office Action of EPO in Application No. 10 772 993.1-1240, dated Jan. 21, 2013.

* cited by examiner

SYSTEM AND METHOD OF CALIBRATING A SYSTEM

The invention relates to a system and method for the measurement of a time period, especially in sports time measurement, wherein said time period is measured on the basis of passing a line of passage of at least one object, such as a finish line of a race, said line of passage being drawn on a ground level.

The invention also relates to a method of calibrating such a system, to a method of recalibration and use of the calibrated system for measurement of a time period.

BACKGROUND

Systems for the measurement of a time period are well known and widely applied in sports time measurement. One of key elements is a camera, also referred to as a photofinish camera. This camera is special, for several reasons. First of all, It has to record very high speed images ("1-D" line or "2-D" image), currently in most systems from 100 to 2000 images per second. In addition thereto, each image has to be exactly time-tagged, with the race-time or day-time or other time-reference. In most cases the precision of this time recording is 1*10-3 s, where the resolution could be easily 1*10-6 s. This high frequency that is clearly above the standard 50 or 60 Hz for displaying on a screen, is a major problem in the field.

One such system is known from EP583441. This known system uses a photosensitive sensor comprising a first and a second coupled CCD device. Half of it is covered with a light-impermeable foil. Using this half sensor, the frequency of the timing signal is doubled to 100 Hz. A marking of the passage line is inserted into the resulting image. The marking may be moved with respect to the image forwards or backwards manually. The marking could also be a light pillar provided behind the passage line. The blocking of said light pillar is then an additional way of identifying the passage of an object or a person. A currently widely applied version of such light pillar is a photocell.

Another system and a calibration method are known from EP898249. The known system is provided with a reticle that is to overlie the image registered or to be registered by the camera. The line of passage is specified to be within this reticle. Processing means are foreseen to extract the relevant image portion corresponding to the reticle from the complete image. Its calibration method is aimed at positioning the reticle. In order to do this adequately, the camera must be aligned perfectly with the line of passage. This alignment is done manually and/or with the help of buttons. Once this is achieved, the camera is put into a spatial mode of registration. Herein, the camera reads at a first frequency of for instance 50 Hz the image signals, and have the resulting image including the line of passage displayed on a screen. The desired area is then selected. In the operation mode, merely the image within the reticle will be sent to the processor, and thus, the frequency can be increased.

A further such system is known from EP516449. This system also allows to select between different lines of an image. Signals corresponding to the line of interest are shifted at low speed, whereas signals corresponding the other lines are shifted at high speed. Therewith, the camera can serve as a slit camera in which data corresponding to a particular line is read out at an overall high speed.

Again a different system is known from WO92-15969. Time measurement in this system is not based on the viewing of the line, but on registration of competitive participants passing the passage line. Thereto, the participants carry an optical marking that includes a code that is specific to the participant. The code is preferably designed such that it can be read independent of the direction along which a participant passes the optical measurement system, for instance a laser scanner.

All of these prior art system suffer from the problem of calibrating the system in order to align the camera perfect with the passage line. The alignment is to be done on a desired point of the passage line, which is for instance its front part. In addition, one would like to adjust the optical device (e.g. lens) for illumination (iris), sharp picture (focus) and image size (zoom). It takes a lot of experience to adjust quickly and correctly and all these elements simultaneously, as the one setting typically affects another one slightly. Moreover, there may be a need to recalibrate the system in the course of a sports event. Light, zoom and focus typically need adjustment for a different type of a race and/or due to light changes.

SUMMARY OF THE INVENTION

It is therefore an object of the present invention to provide a system of the kind mentioned in the opening paragraph, wherein the alignment is simplified, so as to enable recalibration when required.

It is a further object to provide an improved calibration method.

According to a first aspect of the invention, this object is achieved as claimed in claim 1.

In the system for the measurement of a time period, especially in sports time measurement, said time period is measured on the basis of passing a line of passage of at least one object, such as a finish line of a race, said line of passage being drawn on a ground level. The system comprises a camera, a processor and suitably a timer. The camera registers an image of the line of passage that is projected to a photosensitive sensor of the camera through a lens. It is provided with a centre axis running through said lens. The photosensitive sensor is provided with a plurality of sensor columns. The centre axis has an orientation relative to said line of passage. The processor is intended for processing said images so as to provide the measurement of the time period and for calibrating said system.

The timer is to deliver a timing signal to said processor. According to the invention, the system is at least partially automatically aligned. i.e. the orientation of the centre axis is optimized and aligned with reference to said line of passage so as to get said line of passage as well as any objects within said image. Thereto, the system comprises:

- a first active optical indicator that is located at a predefined location with reference to the line of passage, which indicator is detected as part of the image registered by the camera so as to obtain detection data, and
- a controller for adjustment of the orientation of the centre axis of the camera, said adjustment being specified by the processor on the basis of the detection data.

According to a second aspect of the invention, a method of automatic calibration of a system for the measurement of a time period, especially in sports time measurement is provided. The time period is measured on the basis of passing a line of passage of at least one object, such as a finish line of a race, said line of passage being drawn on a ground level. The system comprises:

- a camera registering an image of the line of passage, the camera comprising a base, a photosensitive sensor provided with a plurality of sensor columns and a lens and provided with a centre axis extending through said lens, which centre axis has an orientation relative to said line of passage;

processing means for processing said images into the measurement of the time period and for calibrating said system;

a first active optical indicator that is located at a predefined location with reference to the line of passage.

The camera is aligned relative to the line of passage in a method comprising the steps of:

positioning the camera;

registering an image with a plurality of columns so as to include the line of passage;

detecting the first indicator within the image to obtain detection data;

processing the detection data to obtain an alignment difference, and adjusting the orientation of the centre axis of the camera if the alignment difference exceeds a threshold value.

According to a third aspect of the invention, a kit of parts suitable for the system of the invention is provided. This kit of parts comprises a camera, a first indicator and a controller. The camera registers images of the line of passage by projection of said line onto a photosensitive sensor of the camera. The camera comprises a base, a photosensitive sensor provided with a plurality of sensor columns and a lens and is provided with a centre axis extending through said lens, which centre axis has an orientation relative to said line of passage. The first active optical indicator is located at a predefined location with reference to the line of passage. A processor electronically detects said first indicator within the image to obtain detection data, and processes these detection data. The controller is intended for adjustment of the orientation of the centre axis of the camera, said adjustment being specified on the basis of the detection data.

The kit of parts further may comprise a separate controller for the active indicator, or if present, the plurality of indicators.

According to a fourth aspect of the invention, a method of recalibration of a system is provided. This method is intended for a system calibrated in accordance with the invention. Herein, the recalibration comprises the steps of:

registering images with a plurality of columns so as to include the line of passage and the first indicator;

detecting the first indicator within the image to obtain detection data;

processing the detection data to obtain an alignment difference;

adjusting the orientation of the centre axis of the camera if the alignment difference exceeds a threshold value.

According to a fifth aspect of the invention, a monitoring method is provided for a system for the measurement of a time period, especially in sports time measurement, wherein said time period is measured on the basis of passing a line of passage of at least one object, such as a finish line of a race, said line of passage being drawn on a ground level. The system comprises a camera, a processor, preferably a timer for providing a timing signal to said processor and a first optical indicator that is located at a predefined location with reference to the line of passage. The camera comprises a base, a photosensitive sensor provided with a plurality of sensor columns and a lens. It is provided with a centre axis extending through said lens, which centre axis has an orientation relative to said line of passage, The camera registers images of the line of passage which are projected onto the photosensitive sensor of the camera.

According to the invention, the monitoring method comprises the steps of:

detecting said first indicator, or, if present, said plurality of indicators as part of the image registered by the camera, and signalling a need for recalibration if said first indicator or at least one of said indicators is invisible or only partially visible or moved within the image, and optionally, starting a recalibration by bringing the system into a calibration mode.

Suitably, the same one or more indicators are also used for detection of a passage of a participant across the passage line. Such passage is most suitably be indicated by a change in the modulation of the signal coming from the indicator.

The invention addresses the problem of manual calibration in the prior art by automating, at least partially, the calibration for which an indicator is provided in alignment with the line of passage. The indicator is then, in particularly, registered by the camera. It is thus an optical indicator, or alternatively, a plurality of indicators. If a separate optical sensor were used, instead of the camera, these had to be calibrated and regularly recalibrated with respect to the camera. That would replace the one calibration problem by another one.

Integration of the detection into the camera however creates the additional problem that the indicators have to be recognizable. Therefore, the indicator is active, i.e. it is an active element driven by a controller providing a driving voltage or current and providing an optically detectable signal. Elements considered active in the context of this application are for instance transistors, light emitting diodes, laser diodes, other lamps, etc. The processor can identify the one or more indicator within the image on the basis of pattern recognition. Particularly, the relevant pattern of the indicator has been stored in a memory of the processor. Suitably, the memory contains some further information relating to the indicators, and an algorithm on the basis of which the processor may specify adjustments of the orientation of the centre axis.

The orientation of the centre axis may be specified with a horizontal angle and a vertical angle. The horizontal angle is defined in a camera plane defined by the centre axis and a base of the camera. Notwithstanding the term 'horizontal angle' this camera plane typically does not extend horizontally, but parallel to the base of the camera. The vertical angle is an angle between the centre axis and a normal to the ground level. Both the horizontal angle and the vertical angle are adjusted, in a preferred embodiment by rotating the camera and/or a support to which the camera may be attached. The term 'horizontal alignment' as used hereinafter refers to adjustment of the horizontal angle such that, in a perpendicular top view, the centre axis and the line of passage overlap. The vertical angle is to be set such that all participants will be visible, whatever their size and wherever they cross the line of passage The vertical angle defines the viewing angle. A camera is suitably given an elevated position to obtain a good overview and to ensure that all participants crossing a line of passage next to each other can be seen appropriately In order to obtain an appropriate calibration of the horizontal angle, both the level angle and the positioning of the camera axis in alignment of the line of passage needs to be adequate. Particularly if the camera is located at a relatively large distance from the line of passage, it may become apparent only while setting the horizontal angle, that the level angle and/or the positioning of the camera is not adequate. Here, the indicator of the invention is an important support In a first embodiment, the indicator is thus located at a first height on or above ground level. Preferably, the first height is relatively low so that the indicator is close to ground level. The first height is for instance less than 1 meter, preferably less than 50 cm or even less than 20 cm. A first height of 10 cm is fine. Moreover, with the preferred indicator type discussed below, LED transmitters, optical indicators have been reduced in size to a pointlike feature. Therewith, their height can be specified precisely. Such precise definition of the first height is evidently needed; otherwise the indicators would constitute a systematic source of error and blurr in the measurement.

In a further implementation, the indicator is located at a first height above ground level and in alignment with the line of passage or an extension thereof. This is a most practical embodiment for viewing the plane of the line of passage. Alternative embodiment are however not excluded. One could for instance provide a first indicator before the line of passage and a second indicator after the line of passage, when viewing in the direction of the lane. The height and distance to the line of passage of the first and second indicator is then preferably equal.

In one specific embodiment, two cameras are present, for instance at opposite sides of the passage line. The first active optical indicator then enables an alignment of the two cameras with respect to each other. Preferably, the optical indicator herein transmits data representing timing. Then, the indicator not merely enables a correct spatial alignment of the two cameras, but also a temporal alignment. It is observed for clarity that the number of cameras within the system may be larger than two.

Preferably, use is made of more than one separately located indicator, wherein the first and second indicator are located at different distances from the camera. The provision of a first and a second optical indicator enables the automatic calibration of both the horizontal alignment and the vertical alignment of the camera. The first and second indicator are preferably located on opposite ends or extensions of the line of passage. Such positioning allows continued use of the indicators during operation of the system without hindrance to any participant. Such continued use enables the execution of a recalibration of the system. An alternative positioning of the indicators is a location above each other. In an advantageous positioning, a third indicator is added right above the first one, so that the three indicators are positioned in a vertical plane to the ground level and passing through the line of passage. These locations effectively enable calibration of the camera perfectly horizontally level (e.g. as obtained by a spirit level) and in extension of the line of passage. This is for instance carried out by adjusting the viewed image such that all said three indicators are visible in the same sensor column of the sensor.

Even though complete automation of the calibration is preferred, a partial automation is certainly a practical and affordable solution. In such partial automation, the system provides data to support an operator to execute the calibration, and/or the system guides the operator by specifying individual steps.

The threshold value in the method is preferably very small, so as to give an excellent performance. When expressed in angles, the threshold value may be less than 1 degree, preferably less than 0.1 degree, more preferably less than 0.05 degree or even less than 0.025 degree, such as 0.02 degree. This represents a displacement near the finish line of 1 cm at a camera distance of about 30 m. Even lower threshold values can be achieved herewith.

It is observed for clarity that the light emitted by the active optical indicator may include visible light, infrared and ultraviolet radiation. Visible light is most recognizable. It is thus most suitable for use by less experienced users. Infrared and ultraviolet radiation have the advantage of not disturbing any visual registration for television, in a photograph or by individual spectators watching the sports event. That may be particularly relevant in professional sports events.

In an advantageous embodiment, the one or more active indicators are light emitting devices such as LED transmitters. A LED transmitter comprising one or more light emitting diodes is a type of point-like indicators; i.e. their size is almost negligible in comparison to traditional lamps. This makes that the first height of the indicators can be defined very precisely. Moreover, the use of LED transmitters typically increases speed and accuracy of the detection of the indicators. Additionally, particularly with the use of LED transmitters, it allows more complex coding.

In a first embodiment of the coding, the wavelength or combination of wavelengths of the LEDs is varied. This technique is also referred to as frequency or wavelength modulation. Thereto one can use LEDs with a variable wavelength. Alternatively, one indicator comprises a plurality of LEDs each having a different wavelength. In a second embodiment of the coding, the timewise transmission is varied. In addition to continuous transmission, pulsed transmission may be used. The latter has the advantage that a large number of different codes can be implemented by variation of period and sequence of the pulses. Alternatively, transmission may occur at predefined moments, i.e. as a timed or synchronous transmission. The moment is known by the processor, for instance because it defines the moment itself (it sends a signal to the led transmitter unit); alternatively, the event of light transmission is transmitted to the processor by electric signal communication (wireless, cable, . . . )

In a third embodiment of the coding, the pattern is formed by variation of the strength of the transmitted light, typically referred to as amplitude modulation.

Clearly, the different coding techniques may be combined into more complex codes. That is particularly relevant if the coding is chosen to represent data, so as to result in data transmission. Such data transmission is interesting, for example to transmit a start signal of a race, or the start for each competitor (e.g. time trials); a split signal of a race or a competitor; a finish signal of a race or competitor (e.g. the transmission of the split or finish photocells); the identification of a participant (starting or finishing), if (for example) live picked up by an identification system near the finish line, like a transponder system.

In an advantageous embodiment of said data transmission, the transmitted data represent a time reference of the system. A preferred example of such time reference is a central timing system. This allows synchronisation of the camera timing to another timing reference. This is interesting (but not only then) when using multiple cameras, for reverse side photo-finish timing or video identification cameras.

Preferably, the system is provided with a calibration mode and an operation mode. The image in said calibration mode then represents a wider view than in the operation mode. Particularly, the camera suitably registers image signals in the form of matrices, when operating in the calibration mode. Therewith a two-dimensional image of the finish line and its surroundings (before and after the finish line when viewed along the lane) is given. In the operation mode, the camera suitably registers images in the form of pixel lines, thus generating an image of the finish line over time. The advantage of the latter is that the frequency is increased. The number of pixel lines per image registered in the operation mode tends to depend on the sports type. In many cases, it will be in the range of 1 to 10, but for certain sports, it may be above 100.

It is observed for clarity that the embodiments discussed and/or claimed with respect to one independent claim may also be combined with other independent claims.

BRIEF DESCRIPTION OF THE DRAWINGS

These and other aspects of the invention will be further elucidated with reference to the figures, in which.

DETAILED DESCRIPTION OF THE INVENTION

Figure 1:
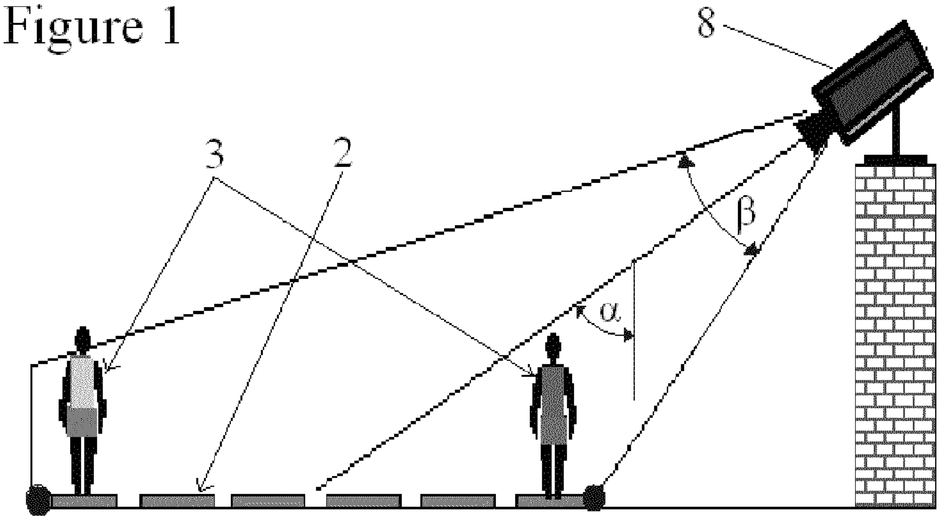
FIG. 1 schematically shows a finish line with a camera in a front view.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

The figures are purely diagrammatic in nature and not drawn to scale. Equal reference numerals in different figures are intended to refer to same or like parts.

FIG. 1 diagrammatically shows a finish line 2 of an athletics track. The athletics track comprises six lanes and two participants 3 are shown. Further shown is a camera 8 in use as a photofinish camera. The camera 8 is located atop a wall, so as to be present at a sufficient height for looking downwards. As a requirement for an appropriate setting the tilt or vertical angle $\alpha$ needs to be set. As a requirement for appropriate zooming, the visible angle $\beta$ needs to be set.

Figure 2:
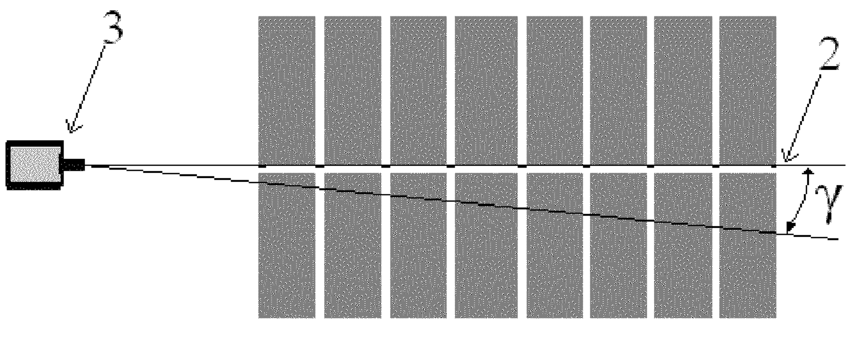
FIG. 2 schematically shows a finish line with a camera in a top view.

FIG. 2 diagrammatically shows a top view of the finish line 2. In this drawings, the track comprises eight lanes. This Figures shows an adequate positioning of the camera 8 in extension of the finish line 2. A horizontal angle $\gamma$ is specified. This horizontal angle $\gamma$ is zero, when the centre axis of the camera 8 is perfectly aligned with the finish line 2. If the horizontal angle $\gamma$ exceeds a threshold, the camera will view the finish line at lane 1 at another location than at line 8. That is not acceptable. Thereto, an appropriate calibration of the camera setting is needed.

Figure 3:
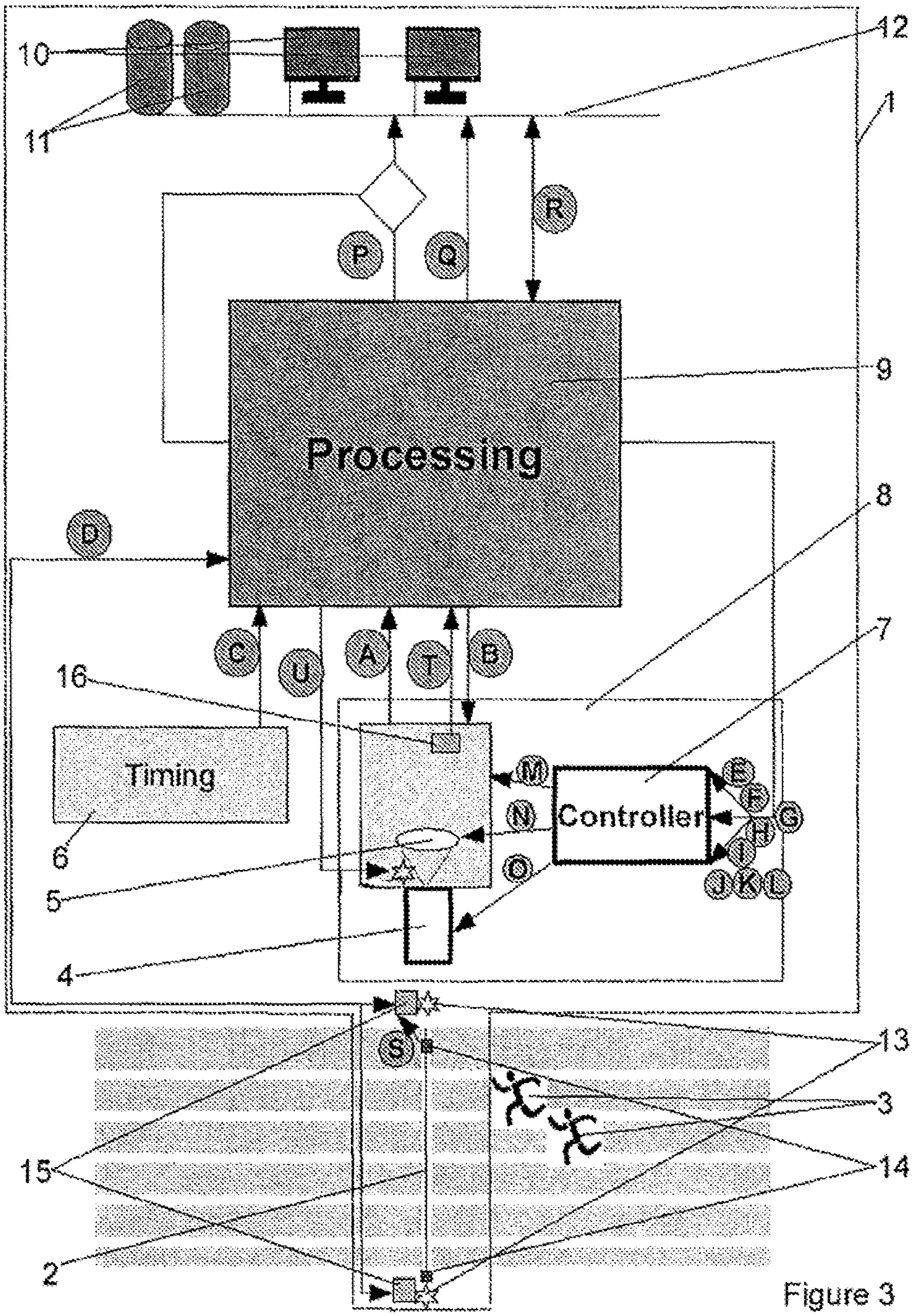
FIG. 3 schematically shows the system of the invention.

FIG. 3 schematically shows the system 1 of the invention according to a first embodiment. The system 1 is aimed at measurement of time periods, which time periods typically end with the passage of passing participants 3 across the passage line 2. The participants 3 typically are athletes, including skiers, cyclists, rowers and other sportsmen. Alternatively, the participants 3 are vehicles, animals like horses, or the like. The passage line 2 is typically the finish line, but could also be an intermediate line or some other line relevant to a race. The physical size of the passage line 2 is dependent on the type of sport and be longer for car races than for a 400 meter running race. A photocell 14 is typically present on the finish line 2 as an additional means of time registration. Its operation is based on signal interruption. Signal S indicates the detection of passing objects 3 by interruption of the photocell 14.

Time periods, and particularly the relevant arrival times, are measured with a camera 8 including a photosensitive sensor 5 and an optical device 4, such as a lens. The lens may be both a fixed lens and a zoom lens. For reasons of flexibility, a zoom lens is usually preferred. The line of passage 2 is projected onto the photosensitive sensor 5 through the lens 4. An image is thus registered by the camera. The camera is typically an electronic camera, and transmits said images to a processor. This is preferably carried out through wires and/or cables. It is observed that the image may be converted in the camera into a optionally compressed set of image signals, from which the processor may regenerate an image. However, the electronic transmission and processing of images is well known in the art and does not need further elaboration here.

Typically, the system has a calibration mode and an operation mode. In the calibration mode, the image effectively corresponds to a two-dimensional view, also called matrix. In the operation mode, the image effectively corresponds to a plurality of columns. The plurality may be set in accordance with requirements and resolution from 1 up to 1000 or more. The image in the operation mode is thus less wide than in the calibration mode.

A known optical problem is that the depth of field may be low. Photofinish cameras have to record their images (line or 2D) super fast, and therefore need to have the lens completely open. As a direct result, they suffer then from a low "depth of field". When the participants 3 are spread over a long finish line 2, some or many objects may be out of focus on the image. Several techniques for optimum performance are known. The "Scheimpflug principle" involves tilting of the photosensitive sensor, e.g. by using a very small servomotor inside the camera. Alternatively or additionally, field depth may be increased on the basis of a trial and error.

The photosensitive sensor 5 of the camera is for instance a CCD image sensor or a CMOS image sensor that are commercially available. Such a sensor is a two-dimensional (2D)-sensor. That has for instance the advantage that a two-dimensional image of the area surrounding the passage line 2 can be made visible for the human operator or the intelligent digital electronic system behind the camera. This imaging of the surrounding area can be exploited for calibration purposes, i.e. to perform adjustments to camera direction (pan, tilt, water or horizontal level), lens settings (iris, zoom, focus), sensor tilt settings and camera settings (recording speed, shutter speed, colour calibration, . . . ).

Demanding requirements are existing for photofinish cameras 8. A photofinish camera 8 is an optical and electronic device like a standard camera, but containing specific features for the typical use in sports timing environment. It has to record very high speed images ("1-D" line or "2-D" image), currently in most systems from 100 to 2000 lines per second or images per second. This speed can increase the coming 10 years by a factor of 50. Moreover, 'image' recordings normally have to be exactly time-tagged with a time-reference. This time-reference can be the race-time or day-time or other time-reference. In other words, the time recording can be relative to the start of the race, or "absolute" daytime or other reference. In most cases the precision of this time recording is 1*10-3 second. However, the resolution could be easily 1*10-6 s, but in other cases this can be even 10 to 1000 times more precise.

The timing signal C is supplied from timing means 6, such as a clock, to the processor 9. The processor 9 is able to analyse images or representative signals thereof A obtained by the camera 8. The images A are preferably pixel matrices in a calibration mode of the system 1, and one or more pixel lines in an operation mode of the system. A controller 7 is present to control the camera, the photosensitive sensor 5 and the lens 4, for instance by adjusting a position or an angle using a motorized system. The control includes ideally all of following controls: control of horizontal angle E, control of horizontal movement F, control of tilt (vertical angle) G, control of the water or horizontal level H, control of photosensitive sensor I according to the above mentioned Scheimpflug principle; control of zoom J, control of focus K, control of iris L. Evidently, less complex systems may include less controls. In the calibration, settings are stored in a memory 11, and/or are compared with data stored in the memory 11. That data may include information provided by a user through the network 12. Typically, when the calibration is not fully automatic, but at least controlled by a user, the results will be shown on a display 10. This display is also used during the race. The results, at least during the race, comprise a linked set of image data Q and timing data P. Control input given by the user through the network 12 is sent as user control information R to the processor 9 and—if applicable—as general camera control B to the camera 8. This general camera control B arranges general camera settings, like recording speed, shutter speed and the like. Movement of the camera 8, the photosensitive sensor 5 or the lens 4 so as to optimize the input of the controller 7 is indicated as M, N and O respectively.

The present invention focuses on the control of horizontal angle E and the control of tilt (vertical angle) G. The term 'horizontal' as used herein refers to an orientation parallel to the ground level at the surrounding area of the finish line 2. The term 'vertical' herein refers to an orientation perpendicular to the ground level at the surrounding area of the finish line 2. The term 'vertical angle' refers to the angle between the centre axis of the camera and the finish line 2 within a plane perpendicular to the ground level. The term 'horizontal angle' refers to an angle between the centre axis of the camera and the finish line 2 within a plane parallel to the ground level.

Prior art system had the disadvantage that the calibration and control of the horizontal angle E and vertical angle G had to be done manually. Generally, it takes a lot of experience to adjust fast and correct and all these elements at the same time, as it is possible that after a correct adjustment of a horizontal angle—also referred to as the horizontal camera direction—, a change in the lens zoom could slightly get the horizontal direction off the said line. Moreover, Many of the—volunteer—operators only use such a photofinish system just a few times pro year, or only once, so that they do not get the opportunity to get experienced. If an experienced operator is found, this person (most of the times volunteers) needs to be available always (first arrival in the morning, last to go home, and every event day), so they tend to quit this 'job'. Even when an experienced operator is available, this human operator can not (re)-adjust a (manual or motorized) camera and (manual or motorized) lens in a fraction of a second. In fact, it does take some persons different minutes. This means that if a camera tripod is hit just before or even during a race, this can have catastrophic consequences.

Therefore, there is a need of aligning the camera to the line of passage automatically, or at least largely automatically, so that one person could oversee a couple of photofinish cameras instead of merely one. This alignment requires that the two-dimensional image is an image which represents the plane through the finish line 2, perpendicular to the ground level. The camera registering the image can herein be present at different heights: at ground level, at a level reachable from ground level, for instance 0.5-2 meters, but also at higher levels. In sports stadiums, the stand is typically used for the camera location. It is then typically at a height in a range from 3 to 30 meters. The lateral distance to the line of passage usually increases with the height. However, it is not excluded that the camera hangs at a location anywhere above the line of passage. As such location is reached less easily, automatic calibration is therein even more important.

The calibration method thereto comprises four major steps: (1) setting of position and level of the camera; (2) obtaining an image from the passage line; (3) determination of the horizontal and optionally the vertical angle, and (4) change of camera settings.

In a first step of the calibration method, the horizontal movement F and the horizontal or water level H are controlled. The control of the horizontal movement F is effectively a verification as to whether the camera 8 is positioned in good alignment with the line of passage. If the centre axis of the camera is not aligned with the passage line 2, the camera needs to be shifted in a horizontal movement. The centre axis of the camera 8 is specifically the centre or optical axis of the lens 4. Clearly, this step can be repeated to confirm that the camera is not displaced.

The control of the horizontal or water level H relates to the orientation of the camera. An adequate orientation is such that a level angle between camera and ground level is close to zero. Ideally, the camera is oriented at a level angle of zero degrees. Instead of requiring that a human operator needs to manually set the centre axis of the camera exactly in the extension of the finish line, it may be automated. A horizontal level or 'water level' sensor 16 can signal to the processor 9 whether the camera 8 is indeed positioned horizontally or includes an angle.

In a second step of the calibration, an image of the line of passage is registered by a photosensitive sensor of the camera. This image includes at least one active optical indicator. While in the calibration mode, the image corresponds to a two-dimensional view; i.e. it includes not merely a relatively small number of pixel lines, but an image showing the line of passage as well as surroundings thereof before and after said line of passage. Instead of merely one image, a plurality of images may be generated, each corresponding to a different setting of the camera with respect to the horizontal angle and/or, optionally, the vertical angle.

In a third step of the calibration, the actual horizontal angle is determined. This is typically the result of processing the image in the processor, i.e. it is done automatically. However, it is not excluded that this step is carried out manually. In that case, it will be typically a visual inspection, and thus likely a relative determination.

In a fourth step of the calibration, the setting of the camera is then specified or modified, so as to obtain an optimum or improved angle resulting from the determination. Typically, the second and third step are thereafter repeated for control. Optionally, it may be necessary to correct the level of the camera and the alignment of the centre axis of the camera. In that case, all preceding steps will be repeated.

In the event that two indicators are present for both the horizontal angle and the vertical angle, one may do the calibration for both simultaneously or consecutively. In case of consecutive calibration, it appears likely that the horizontal angle needs further calibration after amendment of the vertical angle.

In accordance with a preferred embodiment according to the invention, at least two indicators 13, external to the camera, are added to the area surrounding the line of passage 2. A controller 15 is present to control the indicators 13. Control and signalling date D are transmitted from the controller to the processor 6 and vice versa. The transmission protocols are known per se; one could for instance use a wired bus such as I2C or USB. The two indicators 13 are preferably located at or near the outer ends of the finish line 2. This ensures that they are at sufficient distance from each other and that said distance extends substantially parallel to the finish line 2. Such indicators act as reference objects to the system, to fully or partially align the camera system. In a partially automated system, the system supports and/or guides the alignment actions taken by an operator.

The resulting calibration method with the use of the indicators 13 and the camera 8 is then the following. First, the control 15 of the indicators 13 is instructed to make the indicators 13 send out a signal, and preferably what type of signal. Then, the passage line 2 and its surroundings is projected by the lens 4 to the photosensitive sensor 5 and registered therein as a two-dimensional image. This results in image data A in the form of pixel matrices sent to the processor 9. Then, optical recognition of the indicators 13 is performed. User input R could be supportive in this recognition process. Alternatively, information concerning the indicators may be available in the memory 11. It is a further option that the processor 9 can recognize the indicators 13, for instance on the basis of a requirement that the indicators 13 send out a time-variant signal. In the next step of the calibration method, the location of the indicators 13 is compared to the image signal data A. More specifically, when viewing the image data, one indicator is a bottom indicator and the other indicator is a top indicator. Typically, the tilt of the camera 8 is considered optimal for the vertical angle when a first indicator, in particular the bottom indicator 13 is identified in an edge zone. The edge zone is a zone at the bottom of the column. In other words, the bottom indicator should not be in or near the centre of the column and it should not be outside the column. The zoom of the camera 8 is considered optimal, when the top indicator is identified in a predefined region from a top end of the image, in addition to a appropriate positioning of the bottom indicator. Positioning of the camera 8 is considered optimal with respect to the horizontal angle, if both indicators 13 are identified in the same pixel column. Evidently, this is under the assumption that the indicators 13 have been aligned with the line of passage 2, and located very near or on the passage line 2. Less ideal locations are not excluded from the scope of the invention. If the positioning of the camera 8 is optimal, no adjustment is needed. If it is less than optimal, adjustment is required. This adjustment will occur in that the processor 9 sends specific control signals E, F, G and/or H to the controller 7. In the event of adjustment, there will be a next round of projecting the image, registering images, recognizing the indicators and reviewing their locations.

In a further embodiment, a further indicator may be present at a second height larger than the first height. This further indicator is then intended as a horizontal or water level sensor 16. Particularly, it is located above the first indicator. If this indicator is recorded in the same sensor column as the other indicators, the camera is positioned exactly in the extension of the passage line, and the level angle of the camera is zero.

Figure 4:
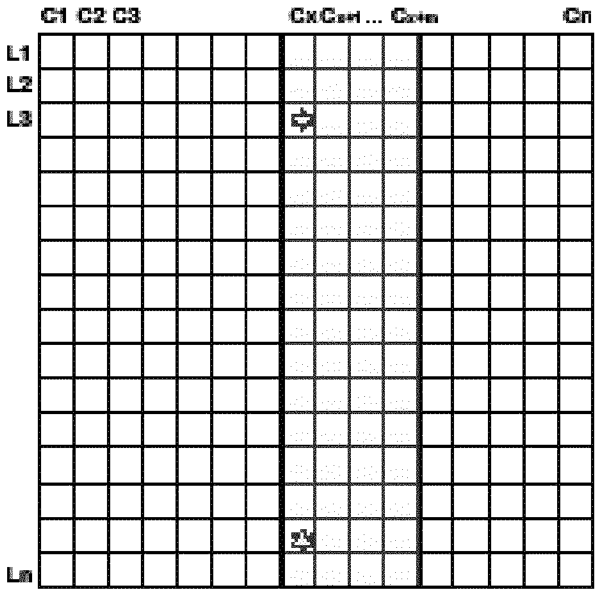
FIG. 4 schematically shows an image obtained during calibration of the system.

FIG. 4 shows an example of the system of the invention in its calibration mode. Here an image—e.g. data corresponding thereto—is shown comprising a plurality of pixel columns Cx, where x is an integer ranging between 1 and n. The pixel columns Cx comprise pixels in a plurality of lines Lx, wherein x ranges between 1 and n. Each pixel shows a small portion of the surrounding of the passage line 2. The indicators 13 are shown in this figure as stars. It will be clear that the shown image has been calibrated, as the indicators are present within the same pixel column. The indicators are shown to be nearly on the outer ends of the passage line 2.

Figure 5:
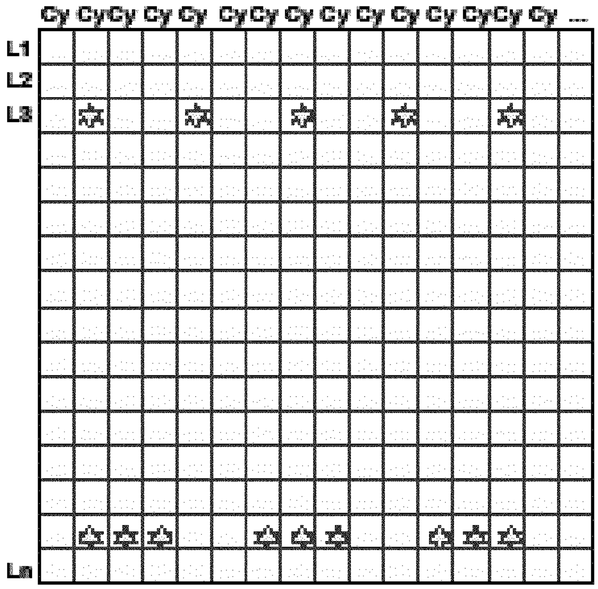
FIG. 5 schematically shows an image obtained during operation of the system.

FIG. 5 then shows the system in its operation mode. Here, of all columns Cx a specific one Cy is selected. This column Cy is the column within which the indicators are present. Each of the columns Cy suitably shows another timeframe in a sequential order. The indicators 13 may be used in this mode to detect if a participant 3 is passing the finishing line 2. In that event, the indicators 13 send a signal by changing frequency, phase or amplitude. The indicators 13 may additionally be used in this mode to monitor the position of the camera 8. If the camera 8 has moved by translation or rotation, at least one of the indicators 13 will be invisible or only visible to a limited extent. Using a regular image recognition in the processor 9, or alternatively by an operator, the need for recalibration can be signalled and/or recalibration may be started automatically.

Most suitably, also the control of zoom J is obtained as part of the calibration method. This control of zoom J effectively is aimed at obtaining a resulting image Q with a size such that the passage line 2 and any participants 3 passing the passage line 2 are shown appropriately on the display 10. Instead of a manual review on the display 10, it is preferable to obtain an appropriate view automatically, or semi-automatically. One way of doing so, is to obtain a distance between the indicators 13 and location of the indicators 13 and use this location and distance information to review optically whether the indicators 13 are in the correct positions. In a simple implementation, the location and distance between the indicators 13 are provided by the user. Alternatively, a relative distance of the indicators 13 within the pixel column may be obtained while reviewing the correctness of the vertical angle. Then, one may make a comparison with standard data stored in the memory 11. For instance, for athletics, an appropriate position of the indicators within the pixel column will be different than for horse races or races with rowing boats. And one may assume that one always desires the same size for athletics. The zoom setting may thereafter be adjusted.

In an even further embodiment, control of focus is also obtained using the indicators 13. This however requires a specific implementation of the indicators 13, e.g. with multiple light emitting diodes for each indicator 13 at a critical distance from each other. Variation of the intensity of the individual light emitting diodes allows then to distinguish said light emitting diodes from each other. If one or both are not recognizable as a sharp image, adjustment of the focus of the lens is probably needed. Such a control of the focus is not only useful as part of an initial calibration, but also as part of an intermediate recalibration. Focus tends to change, and moreover changes in weather conditions might have an impact on focus and other lens settings such as diaphragm.

A most suitable implementation of active indicators are light emitting devices such as light emitting diodes, also known as LED-transmitters. A LED transmitter may be provided with one LED or with more LEDs in combination. Typically, the size of the active indicator is at most 1% of the size of the finish line, more preferably at most 0.25% and preferably 0.1% or less. In order to be recognizable, the active transmitter is coded. Different types of coding are known, such as frequency or wavelength modulation, amplitude modulation, synchronous or timed modulation, and variation of the signal over time, i.e. by pulsing the light or light sequences. Numerous combinations of these coding techniques may be used.

The indicators 13 may further be used after calibration. The fact that the indicator 13 can be obscured by an object close to or on the finish line, can not be seen as a problem only, but in most cases as an advantage; such blocking can be used as an automatic finish detection feature. This can (in some cases) avoid the purchase, mounting, and maintenance of special finish photocells 14. Such photocells are sometimes even very expensive if they have to cover a wide distance (e.g. 50 m or more) or when not very practical or feasible due to the finish environment (for example; races on water, river, channel or lake).

The continuous received codes from the indicators 13 can be used as a safe confirmation that the camera 8 is still perfectly aligned. An alarm can be given if these codes are not detected any more. In that case, the system may be brought from its operation mode into the calibration mode again. Typically, the calibration mode provides a wider view (2-D detection). A signal could confirm the operator that the camera has been moved or pushed or otherwise changed settings. The next step would/should be a manual or automatic re-alignment procedure, which can prevent a catastrophe (no accurate time and/or rank result for that race or competitor). It is observed that such a step back from the operation mode into the calibration mode do not need to take a long period. In view of the high frequencies of operation, a time period clearly less than a second probably is sufficient for a fully automatic review.

LIST OF REFERENCE NUMERALS

1 system
2 line of passage
3 passing object or participant
4 lens
5 photosensitive sensor
6 timing device
7 controller
8 camera
9 processor
10 displays
11 memory
12 network
13 indicator
14 finish photocell
15 controller of indicator
16 horizontal or water level sensor
A image
B general camera control
C timing data
D indicator control and signaling line
E control of horizontal angle
F control of horizontal movement
G control of tilt (vertical)
H control of horizontal or water level
I control of sensor 5 according to the Scheimpflug principle
J control of zoom
K control of focus
L control of iris
M+N+O move the camera (8), the sensor (5) or the lens (4) to optimize the input of the controller
P image data
Q timing data
R user control
S detection of passing objects by interruption of photocell (14)
T horizontal or Water level sensor signal
U control of internal indicator

The invention claimed is:

1. A system for capturing an image and for at least partially automatically aligning a camera with a line, comprising:

a camera registering images of said line and an area surrounding said line, said camera comprising a photosensitive sensor provided with a plurality of sensor columns and a lens having a center axis extending through said lens, said center axis having an orientation relative to said line;

processing means for processing said images and for calibrating said system;

at least a first active optical indicator that is located along said line or in the area surrounding said line with reference to the line, which indicator is detectable as part of the image registered by the camera so as to obtain detection data, and camera adjustment means for adjustment of the orientation of the center axis of the camera, said adjustment being specified on the basis of the detection data, wherein said camera adjustment means is configured to align the camera relative to said line when an alignment difference based on the at least first active optical indicator within the image exceeds a threshold value.

2. The system of claim 1, wherein the system is arranged to measure a time period, wherein said time period is measured on the basis of an object passing the line.

3. The system of claim 1, wherein the line is a line of passage of at least one object, said line of passage being drawn on a ground level.

4. The system of claim 1, comprising a second optical indicator that is located at a predefined location with reference to the line, which second optical indicator is detectable as part of the image registered by the camera so as to obtain detection data, or comprising a second optical indicator, that is an active optical indicator or wherein said second optical indicator is located at a height on or above ground level, or wherein said at least a first indicator is located at a height on or above ground level, or wherein at least one of said at least first indicator and said second indicator is aligned, at least substantially, with the line or an extension thereof.

5. The system of claim 1, wherein the at least first active indicator is an LED-transmitter comprising at least one LED or wherein the second active indicator is a LED-transmitter comprising at least one LED or wherein multiple LED-transmitters are present, and including processing means capable of distinguishing the LED transmitters from each other, and, on the basis thereof, deciding to modify the focus of the lens so as to do a sharpness adjustment or wherein the at least first active indicator is an LED-transmitter comprising at least one LED and the LED transmitter is programmable in intensity.

6. The system of claim 1, wherein the indicator is codable by modulation.

7. The system of claim 6, wherein the code represents data, so as to result in data transmission.

8. The system according to claim 1, further comprising a horizontal level sensor which provides a representative signal so as to calibrate level setting of the camera.

9. The system according to claim 1, including a calibration mode for calibration of the system and an operation mode for measurements, in which calibration mode the image represents a wider view than in the operation mode.

10. The system of claim 1, including a zoom adjustment means for adjustment of image size, said adjustment being based upon identification of relative distance between detected data corresponding to the indicators.

11. The system according to claim 1, further comprising signaling means for signaling a need for recalibration.

12. A method of capturing an image and for at least partially automatically aligning a camera with a line, using a system that comprises:

a camera generating images of said line and an area surrounding said line, the camera comprising a photosensitive sensor provided with a plurality of sensor columns and a lens and provided with a center axis extending through said lens, which center axis has an orientation relative to said line, processing means for processing said images and for calibrating said system;

at least a first active optical indicator that is located along said line or in the area surrounding said line with reference to the line;

said method comprising the steps: aligning the camera relative to the line by:

positioning the camera;

registering images with the plurality of columns so as to include the line or area surrounding the line and the first indicator;

detecting the first indicator within the image to obtain detection data;

processing the detection data to obtain an alignment difference;

adjusting the orientation of the center axis of the camera if the alignment difference exceeds a threshold value.

13. The method of claim 12 further comprising the measurement of a time period, wherein said time period is measured on the basis of an object passing the line, said line being drawn on a ground level.

14. The method as claimed in claim 12, wherein the positioning step comprises:

placing the center axis of the camera in extension of the line, and positioning the sensor columns of the photosensitive sensor perpendicular to the ground level, when viewed from a rear side of the camera, looking towards the line.

15. The method as claimed in claim 12, wherein the orientation of the center axis is defined by a horizontal angle in a camera plane parallel to a base of the camera and a vertical angle relative to a vertical axis normal to ground level, and a second active optical indicator is located at a predefined location with reference to the line the adjustment step comprising:

adjusting the vertical angle of the camera, if an indicator is located outside a predetermined edge zone, and adjusting the horizontal angle of the camera, if the detected indicators are located in different sensor columns.

16. A kit of parts for use in the system as claimed in claim 1, comprising:

a camera for generating images of a line, said camera comprising a photosensitive sensor provided with a plurality of sensor columns and a lens and provided with a center axis extending through said lens, which center axis has an orientation relative to said line, at least a first active optical indicator that is for location at a predefined location with reference to the line, and detecting means for electronically detecting said indicator within said image to obtain detection data, and camera adjustment means for adjustment of the orientation of the center axis of the camera, said adjustment being specified on the basis of the detection data.

17. A method of recalibration of a system calibrated in accordance with claim 16, comprising the steps:

registering images with a plurality of columns so as to include the line and the first indicator in the resulting image;

detecting the at least first indicator within an image to obtain detection data;

processing the detection data to obtain an alignment difference;

adjusting the orientation of the centre axis of the camera if the alignment difference exceeds a threshold value.

18. A method for measurement of a time period using of a calibrated system as claimed in claim 1, wherein said time period is measured on the basis of passing a line of passage of at least one object.

19. A method of monitoring a system for the measurement of a time period, wherein said time period is measured on the basis of passing a line of passage of at least one object, said line of passage being drawn on a ground level, which system comprises:

a camera generating images of said line of passage and an area surrounding said line of passage, the camera comprising a photosensitive sensor provided with a plurality of sensor columns and a lens provided with a center axis extending through said lens, which center axis has an orientation relative to said line of passage, processing means for processing said images into the measurement of the time period and for calibrating said system;

at least a first active optical indicator that is located along said line or in the area surrounding said line with reference to the line of passage, which method comprises the steps of:

detecting said at least first indicator as part of the images registered by the camera, and signaling a need for recalibration if said at least first indicator is invisible or only partially visible or moved within the image, and optionally, starting a recalibration by bringing the system into a calibration mode.

20. A non-transitory storage medium storing a computer executable program for optical recognition of the first indicator in the system as claimed in claim 1.

21. The system according to claim 1, further comprising a motorized system configured to automatically adjust a position or angle of the camera with respect to the line.

22. The system according to claim 1, wherein the area surrounding said line includes surroundings before and surroundings after said line.

* * * * *